US012417746B2

(12) United States Patent
Kim et al.

(10) Patent No.: US 12,417,746 B2
(45) Date of Patent: Sep. 16, 2025

(54) GATE DRIVING CIRCUIT AND DISPLAY DEVICE INCLUDING THE SAME

(71) Applicant: Samsung Display Co., LTD., Yongin-si (KR)

(72) Inventors: Kyumin Kim, Yongin-si (KR); Sung-Hoon Lim, Yongin-si (KR); Woogeun Lee, Yongin-si (KR); Seungsok Son, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/625,960

(22) Filed: Apr. 3, 2024

(65) Prior Publication Data

US 2024/0339083 A1 Oct. 10, 2024

(30) Foreign Application Priority Data

Apr. 6, 2023 (KR) ........................ 10-2023-0045478

(51) Int. Cl.
*G09G 3/3266* (2016.01)

(52) U.S. Cl.
CPC ..... *G09G 3/3266* (2013.01); *G09G 2310/061* (2013.01); *G09G 2310/08* (2013.01); *G09G 2320/0233* (2013.01); *G09G 2320/0247* (2013.01)

(58) Field of Classification Search
CPC ......... G09G 2310/061; G09G 2310/08; G09G 2320/0233; G09G 2320/0247; G09G 3/3233; G09G 3/3266
See application file for complete search history.

(56) References Cited

U.S. PATENT DOCUMENTS

| | | | | |
|---|---|---|---|---|
| 2020/0074933 | A1* | 3/2020 | Ban | G09G 3/3291 |
| 2020/0372851 | A1* | 11/2020 | Kim | G09G 3/2092 |
| 2021/0202676 | A1* | 7/2021 | Jeong | H10K 59/10 |
| 2022/0084472 | A1* | 3/2022 | Kim | G09G 3/3266 |
| 2024/0161701 | A1* | 5/2024 | Kim | G09G 3/3233 |

FOREIGN PATENT DOCUMENTS

| | | | |
|---|---|---|---|
| KR | 101962860 | B1 | 3/2019 |
| KR | 1020220046067 | A | 4/2022 |

* cited by examiner

*Primary Examiner* — Nitin Patel
*Assistant Examiner* — Amen W Bogale
(74) *Attorney, Agent, or Firm* — CANTOR COLBURN LLP

(57) ABSTRACT

A gate driving circuit includes a stage configured to output a scan gate signal based on a scan clock signal, a voltage of a first node, and a voltage of a second node, and to output a sensing gate signal based on, a sensing clock signal, the voltage of the first node, and the voltage of the second node. The stage includes: a first sensing circuit configured to select a gate line to be sensed based on a S1 signal or to determine a frame reset based on a S7 signal; a first inverting circuit configured to control the first sensing circuit base on the S7 signal; and a second sensing circuit configured to control the voltage of the first node using the first sensing circuit based on a S2 signal. The frame reset is determined based on a maximum frequency of a variable frame frequency.

18 Claims, 10 Drawing Sheets

GATE DRIVING CIRCUIT AND DISPLAY DEVICE INCLUDING THE SAME

This application claims priority to Korean Patent Application No. 10-2023-0045478, filed on Apr. 6, 2023, and all the benefits accruing therefrom under 35 U.S.C. § 119, the contents of which in their entirety are herein incorporated by reference.

BACKGROUND

1. Field

Embodiments of the present invention relate to a gate driving circuit and a display device including the same. More particularly, embodiments of the present invention relate to a gate driving circuit and a display device including the same for operating in a variable frequency mode.

2. Description of the Related Art

Generally, a display device includes a display panel and a display panel driver. The display panel includes gate lines, data lines and pixels. The display panel driver includes a gate driver providing gate signals to the gate lines, the data driver providing data voltages to the data lines, and a driving controller controlling the gate driver and the data driver. The display panel driver further includes a compensator compensating for deterioration and mobility of the pixels.

In a display device operating in a variable frequency mode, a luminance of a display panel driven at a first frame frequency may be different from a luminance of the display panel driven at a second frame frequency different from the first frame frequency. Accordingly, a flicker may occur when a frame frequency of the display panel is changed.

SUMMARY

Embodiments of the present invention provide a gate driving circuit for displaying an image with uniform luminance at different frame frequencies.

Embodiments of the present invention provide a display device including the gate driving circuit.

In an embodiment of a gate driving circuit according to the present invention, the gate driving circuit includes a stage configured to output a scan gate signal based on a scan clock signal, a voltage of a QN node, and a voltage of a QBN node, and to output a sensing gate signal based on, a sensing clock signal, the voltage of the QN node, and the voltage of the QBN node. The stage includes: a first sensing circuit configured to select a gate line to be sensed based on a S1 signal or to determine a frame reset based on a S7 signal, a first inverting circuit configured to control the first sensing circuit base on the S7 signal, and a second sensing circuit configured to control the voltage of the QN node using the first sensing circuit based on a S2 signal. The frame reset is determined based on a maximum frequency of a variable frame frequency.

In an embodiment, the first inverting circuit may include a 27th transistor and a 28th transistor, the 27th transistor may include a gate electrode for receiving an inverting voltage, a first electrode for receiving the inverting voltage, and a second electrode connected to a first electrode of the 28th transistor, and the 28th transistor may include a gate electrode for receiving the S7 signal, the first electrode connected to the second electrode of the 27th transistor, and a second electrode for receiving a second low voltage.

In an embodiment, the first sensing circuit may include a 24th transistor, a 25th transistor, and a 26th transistor, the 24th transistor may include a gate electrode for receiving the S7 signal, a first electrode for receiving a S6 signal, a second electrode connected to a second electrode of the 26 transistor, the 25th transistor may include a gate electrode for receiving the S1 signal, a first electrode for receiving a previous carry signal which is one of carry signals of previous stages, a second electrode connected to a first electrode of the 26th transistor, and the 26th transistor may include a gate electrode connected to the first inverting circuit, the first electrode connected to the second electrode of the 25th transistor, and the second electrode connected to the second electrode of the 24th transistor.

In an embodiment, the first sensing circuit may further include a 19-1 transistor and a 19-2 transistor, the 19-1 transistor may include a gate electrode for receiving the S1 signal, a first electrode connected to the second electrode of the 24th transistor, a second electrode connected to a first electrode of the 19-2 transistor, and the 19-2 transistor may include a gate electrode for receiving the S1 signal, the first electrode connected to the second electrode of the 19-1 transistor, and a second electrode connected to a second electrode of a third capacitor.

In an embodiment, the second sensing circuit may include a 20th transistor, a 21st transistor, and the third capacitor, the 20th transistor may include a gate electrode connected to the second electrode of the third capacitor, a first electrode for receiving the S6 signal, and a second electrode connected to a first electrode of the 21st transistor, the 21st transistor may include a gate electrode for receiving the S2 signal, the first electrode connected to the second electrode of the 20th transistor, a second electrode connected to the QN node, and the third capacitor may include a first electrode for receiving the S6 signal and the second electrode connected to the second electrode of the 19-2 transistor.

In an embodiment, the second sensing circuit may include a 22nd transistor and a 23rd transistor, the 22nd transistor may include a gate electrode connected to the second electrode of the third capacitor, a first electrode connected a second electrode of the 23rd transistor, a second electrode connected to the QBN node, and the 23rd transistor may include a gate electrode for receiving the S2 signal, a first electrode for receiving a first low voltage, and the second electrode connected the first electrode of the 22nd transistor.

In an embodiment, the stage may further include a first pull up control circuit, and the first pull up control circuit may apply a S6 signal to the QN node based on the voltage of the QN node.

In an embodiment, the stage may further include a second pull up control circuit, and the second pull up control circuit may apply a previous carry signal which is one of carry signals of previous stages to the QN node based on the previous carry signal.

In an embodiment, the stage may further include a third pull up control circuit, and the third pull up control circuit may apply a first low voltage to the QN node based on a second next carry signal which is one of carry signals of next stages.

In an embodiment, the stage may further include a fourth pull up control circuit, and the fourth pull up control circuit may apply a first low voltage to the QN node based on the voltage of the QBN node.

In an embodiment, the stage may further include a second inverting circuit, and the second inverting circuit may apply an inverting voltage to the QN node based on the voltage of the QB node.

In an embodiment, the stage may further include a reset circuit, and the reset circuit may apply a first low voltage to the QN node based on a S5 signal.

In an embodiment, the stage may further include a sensing gate output circuit, and the sensing gate output circuit may include: a 1-1 transistor configured to apply the sensing clock signal to a sensing gate output node based on the voltage of the QN node, a 2-1 transistor configured to apply a second low voltage to the sensing gate output node based on a first next carry signal which is one of carry signals of next stages, a 3-1 transistor configured to apply the second low voltage to the sensing gate output node based on the voltage of the QBN node, and a first capacitor connected between a gate electrode of the 1-1 transistor and the sensing gate output node.

In an embodiment, the stage may further include a scan gate output circuit, the scan gate output circuit may include: a 1-2 transistor configured to apply a scan clock signal to a scan gate output node based on the voltage of the QN node, a 2-2 transistor configured to apply the second low voltage to the scan gate output node based on the first next carry signal, a 3-2 transistor configured to apply the second low voltage to the scan gate output node based on the voltage of the QBN node, and a second capacitor connected between a gate electrode of the 1-2 transistor and the scan gate output node.

In an embodiment, the stage may further include a carry output circuit, the carry output circuit may include: a 15th transistor configured to apply a carry clock signal to a carry output node based on the voltage of the QN node, a 11th transistor configured to apply a first low voltage to the carry output node based on the voltage of the QBN node, and a 17th transistor configured to apply the first low voltage to the scan gate output node based on the first next carry signal.

In an embodiment of a display device according to the present invention, the display device includes a display panel including a pixel and a gate driver configured to apply a scan gate signal and a sensing gate signal to the pixel. A gate driving circuit of the gate driver includes: a stage configured to output a scan gate signal based on a scan clock signal, a voltage of a QN node, and a voltage of a QBN node, and to output a sensing gate signal based on, a sensing clock signal, the voltage of the QN node, and the voltage of the QBN node. The stage includes: a first sensing circuit configured to select a gate line to be sensed based on a S1 signal or to determine a frame reset based on a S7 signal, a first inverting circuit configured to control the first sensing circuit base on the S7 signal, and a second sensing circuit configured to control the voltage of the QN node using the first sensing circuit based on a S2 signal. The frame reset is determined based on a maximum frequency of a variable frame frequency.

In an embodiment, the first inverting circuit may include a 27th transistor and a 28th transistor, the 27th transistor may include a gate electrode for receiving an inverting voltage, a first electrode for receiving the inverting voltage, and a second electrode connected to a first electrode of the 28th transistor, and the 28th transistor may include a gate electrode for receiving the S7 signal, the first electrode connected to the second electrode of the 27th transistor, and a second electrode for receiving a second low voltage.

In an embodiment, the first sensing circuit may include a 24th transistor, a 25th transistor, and a 26th transistor, the 24th transistor may include a gate electrode for receiving the S7 signal, a first electrode for receiving a S6 signal, a second electrode connected to a second electrode of the 26 transistor, the 25th transistor may include a gate electrode for receiving the S1 signal, a first electrode for receiving a previous carry signal which is one of carry signals of previous stages, a second electrode connected to a first electrode of the 26th transistor, and the 26th transistor may include a gate electrode connected to the first inverting circuit, the first electrode connected to the second electrode of the 25th transistor, and the second electrode connected to the second electrode of the 24th transistor.

In an embodiment, the first sensing circuit may further include a 19-1 transistor and a 19-2 transistor, the 19-1 transistor may include a gate electrode for receiving the S1 signal, a first electrode connected to the second electrode of the 24th transistor, a second electrode connected to a first electrode of the 19-2 transistor, and the 19-2 transistor may include a gate electrode for receiving the S1 signal, the first electrode connected to the second electrode of the 19-1 transistor, and a second electrode connected to a second electrode of a third capacitor.

In an embodiment, the second sensing circuit may include a 20th transistor, a 21st transistor, and the third capacitor, the 20th transistor may include a gate electrode connected to the second electrode of the third capacitor, a first electrode for receiving the S6 signal, and a second electrode connected to a first electrode of the 21st transistor, the 21st transistor may include a gate electrode for receiving the S2 signal, the first electrode connected to the second electrode of the 20th transistor, a second electrode connected to the QN node, and the third capacitor may include a first electrode for receiving the S6 signal and the second electrode connected to the second electrode of the 19-2 transistor According to the gate driving circuit and the display device according to the embodiments, the stage may include the first sensing circuit which selects a gate line to be sensed based on the S1 signal or determines the frame reset based on the S7 signal, the first inverting circuit which controls the first sensing circuit based on the S7 signal, and the second sensing circuit which controls the voltage of the QN node using the first sensing circuit based on the S2 signal. The frame reset may be determined based on the maximum frequency of the variable frame frequency. Accordingly, the display device may display images with uniform luminance at different frame frequencies.

BRIEF DESCRIPTION OF THE DRAWINGS

The above and other features of embodiments of the present invention will become more apparent by describing in detailed embodiments thereof with reference to the accompanying drawings, in which.

DETAILED DESCRIPTION

It will be understood that when an element is referred to as being "on" another element or "connected to" another element, it can be directly on or directly connected to the other element or intervening elements may be present therebetween. In contrast, when an element is referred to as being "directly on" another element, there are no intervening elements present.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third", "S1", "S2" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein. Hereinafter, embodiments of the present invention will be described in detail with reference to the accompanying drawings.

Figure 1:
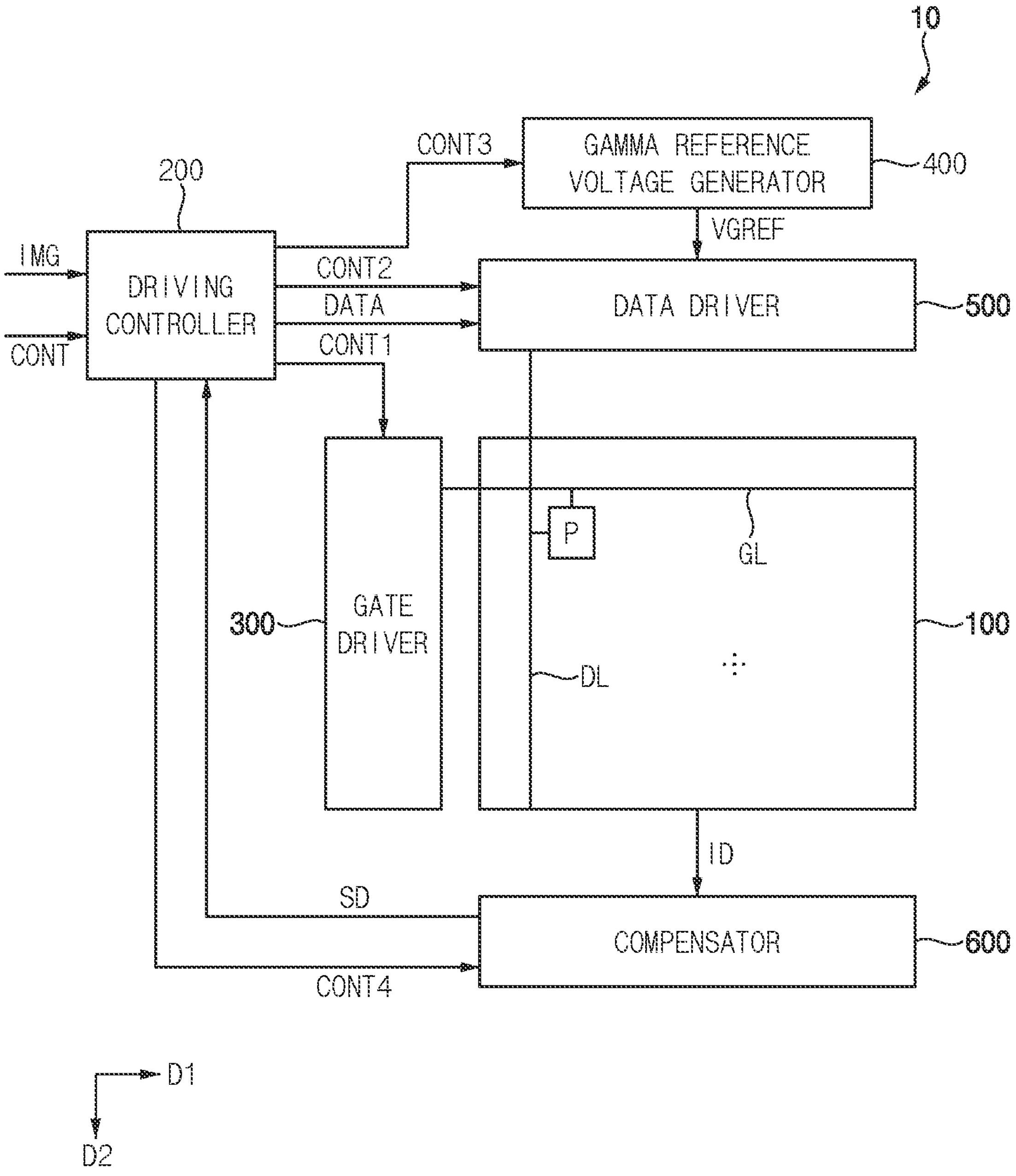
FIG. 1 is a block diagram for illustrating a display device according to embodiments of the present invention.
Figure 2:
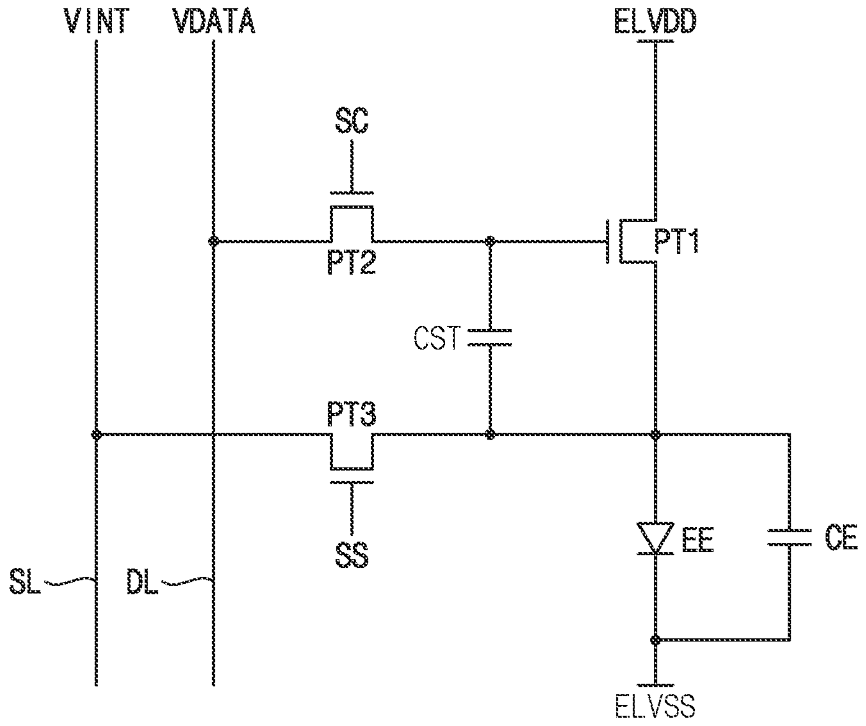
FIG. 2 is a circuit diagram for illustrating a pixel of a display panel of FIG. 1.

FIG. 1 is a block diagram for illustrating a display device 10 according to embodiments of the present invention. FIG. 2 is a circuit diagram for illustrating a pixel P of a display panel 100 of FIG. 1.

Referring to FIGS. 1 and 2, a display device 10 may include a display panel 100 and a display panel driver. The display panel driver may include a driving controller 200, a gate driver 300, a gamma reference voltage generator 400, a data driver 500, and a compensator 600.

In an embodiment, for example, the driving controller 200 and the data driver 500 may be integrally formed. In an embodiment, for example, the driving controller 200, the gamma reference voltage generator 400, and the data driver 500 may be integrally formed. In an embodiment, for example, the driving controller 200, the gate driver 300, the gamma reference voltage generator 400, and the data driver 500 may be integrally formed. A driving module including at least the driving controller 200 and the data driver 500 which are integrally formed may be referred to as a timing controller embedded data driver ("TED").

The display panel 100 may include a display region displaying an image and a peripheral region disposed adjacent to the display region.

In an embodiment, for example, the display panel 100 may be an organic light emitting diode display panel including organic light emitting diodes. In an embodiment, for example, the display panel 100 may be a quantum-dot organic light emitting diode display panel including organic light emitting diodes and quantum-dot color filters. In an embodiment, for example, the display panel 100 may be a quantum-dot nano light emitting diode display panel including nano light emitting diodes and quantum-dot color filters.

The display panel 100 may include gate lines GL, data lines DL, and pixels P electrically connected to the gate lines GL and the data lines DL. The gate lines GL may extend in a first direction D1, and the data lines DL may extend in a second direction D2 crossing the first direction D1.

The driving controller 200 may receive input image data IMG and an input control signal CONT from an external device. In an embodiment, for example, the input image data IMG may include red image data, green image data, and blue image data. The input image data IMG may further include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the compensator 600 based on the input control signal CONT and output the fourth control signal CONT4 to the compensator 600.

The gate driver 300 may generate gate signals for driving the gate lines GL in response to the first control signal CONT1 received from the driving controller 200. The gate driver 300 may output the gate signals to the gate lines GL.

In an embodiment, the gate driver 300 may be integrated on the peripheral region of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

In an embodiment, the gamma reference voltage generator 400 may be disposed in the driving controller 200 or the data driver 500.

The data driver 500 may receive the second control signal CONT2 and the data signal DATA from the driving controller 200 and receive the gamma reference voltage VGREF from the gamma reference voltage generator 400. The data driver 500 may convert the data signal DATA into a data voltage in analog form. The data driver 500 may output the data voltage to the data line DL.

The compensator 600 may receive a driving current ID from the pixel P through a sensing line SL, generate sensing data SD corresponding to the driving current ID, and output the sensing data SD to the driving controller 200. The sensing data SD may be data for compensating for deterioration and mobility of the pixel P. The driving controller 200 may compensate for the input image data IMG based on the sensing data SD. Meanwhile, as shown in FIG. 1, the compensator 600 may be implemented as a separate integrated circuit, but is not limited thereto. For another example, the compensator 600 may be included in the data driver 500.

The pixel P may include a first pixel switching element PT1, a second pixel switching element PT2, a third pixel switching element PT3, a light emitting element EE, and a storage capacitor CST.

The first pixel switching element PT1 may include a gate electrode connected to the storage capacitor CST, a first electrode for receiving a first power voltage ELVDD, and a second electrode connected to the light emitting element EE.

The second pixel switching element PT2 may include a gate electrode for receiving a scan gate signal SC, a first electrode connected to the data line DL, and a second electrode connected to the gate electrode of the first pixel switching element PT1. The data line DL may transmit the data voltage VDATA to the first electrode of the second pixel switching element PT2.

The third pixel switching element PT3 may include a gate electrode for receiving a sensing gate signal SS, a first electrode connected to the sensing line SL, and a second electrode connected to the light emitting element EE. When the display panel 100 is driven at a variable frame frequency, the sensing line SL may transfer an initialization voltage VINT to the first electrode of the third pixel switching element PT3. When the display device 10 performs a selective sensing operation, the sensing line SL may receive the driving current ID and transfer the driving current ID to the compensator 600.

The light emitting element EE may include an anode electrode connected to the second electrode of the first pixel switching element PT1 and a cathode electrode for receiving the second power supply voltage ELVSS.

The storage capacitor CST may include a first electrode connected to the gate electrode of the first pixel switching element PT1 and a second electrode connected to the second electrode of the first pixel switching element PT1.

The pixel P may further include a light emitting element capacitor CE connected to the anode electrode of the light emitting element EE and the cathode electrode of the light emitting element EE. The light emitting element capacitor CE may mean an internal capacitance of the light emitting element EE.

When the scan gate signal SC is activated, the second pixel switching element PT2 may be turned on, and the data voltage VDATA may be applied to the gate electrode of the first pixel switching element PT1.

When the sensing gate signal SS is activated, the third pixel switching element PT3 may be turned on, and the driving current ID may be received through the sensing line SL. Alternatively, when the sensing gate signal SS is activated, the third pixel switching element PT3 may be turned on, and the initialization voltage VINT may be applied to the second electrode of the first pixel switching element PT1.

Figure 3:
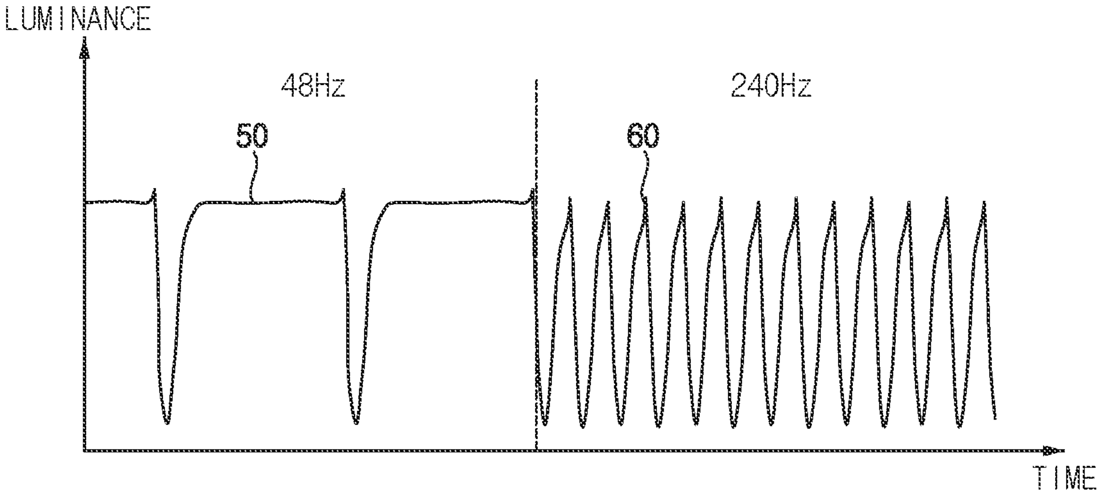
FIG. 3 is a diagram for illustrating a luminance of a display panel driven at about 48 Hz and about 240 Hz in a conventional display device.

FIG. 3 is a diagram for illustrating a luminance of a display panel 100 driven at about 48 Hz and about 240 Hz in a conventional display device 10.

FIGS. 1 to 3, the display panel 100 may operate in a normal mode or a variable frequency mode.

In the normal mode, the display panel 100 may operate at a fixed input frame frequency (e.g., about 240 Hz). In the variable frequency mode, the display panel 100 may operate with the variable frame frequency.

In the normal mode, the external device may provide the input image data IMG at the fixed input frame frequency to the driving controller 200, and the display panel 100 may operate at the fixed input frame frequency. That is, the driving controller 200 may control the data driver 500 and the gate driver 300 to drive the display panel 100 at the fixed input frame frequency (i.e., a fixed frame frequency of the display panel 100).

In the variable frequency mode, the external device may provide the input image data IMG at the variable frame frequency (or a variable frame rate) to the driving controller 200 by changing a time length of a blank period for every frame. The blank period may be a period in which the data voltage VDATA is not applied to the pixel P, and a selective sensing operation may be performed in the blank period. A frame frequency of the display panel 100 may be dynamically changed based on the variable frame frequency. That is, the driving controller 200 may control the gate driver 300 and the data driver 500 to drive the display panel 100 at the variable frame frequency. In an embodiment, for example, the variable frame frequency may have a range of about 1 Hz to about 240 Hz, but is not limited thereto. Also, for another example, the variable frequency mode may be a Free-Sync mode or a G-Sync mode, but is not limited thereto.

In FIG. 3, examples of light waveforms of a conventional display device 10 driven at about 48 Hz and about 240 Hz are shown. The conventional display device 10 may have a large luminance difference at different frame frequencies. When the frame frequency is changed, a flicker may occur in the conventional display device 10.

The luminance difference between the different frame frequencies may occur because the light waveforms 50 and 60 at the different frame frequencies have different numbers of luminance valleys (especially when displaying a low grayscale image). In order to reduce the luminance difference between the different frame frequencies, in the display device 10 according to the embodiments of the present invention, a frame reset operation may be performed at regular intervals regardless of the frame frequency in the variable frequency mode.

In an embodiment, for example, the frame reset operation may be performed based on a maximum frequency of the variable frame frequency regardless of the frame frequency in the variable frequency mode. In an embodiment, for example, the frame reset operation may be an anode initialization operation. The anode initialization operation may be an operation in which the initialization voltage VINT is applied to the anode electrode of the light emitting element EE.

The gate driver 300 may apply the scan gate signal SC and the sensing gate signal SS to the pixel P in a display period. In a hold period, the gate driver 300 may not apply the scan gate signal SC to the pixel P, and the gate driver 300 may apply the sensing gate signal SS to the pixel P based on the maximum frequency of the variable frame frequency regardless of the frame frequency. The initialization voltage VINT may be applied to the anode electrode of the light emitting element EE based on the sensing gate signal SS.

The data driver 500 may apply the data voltage VDATA to the pixel P in the display period and the data voltage VDATA may be maintained in the hold period.

Figure 4:
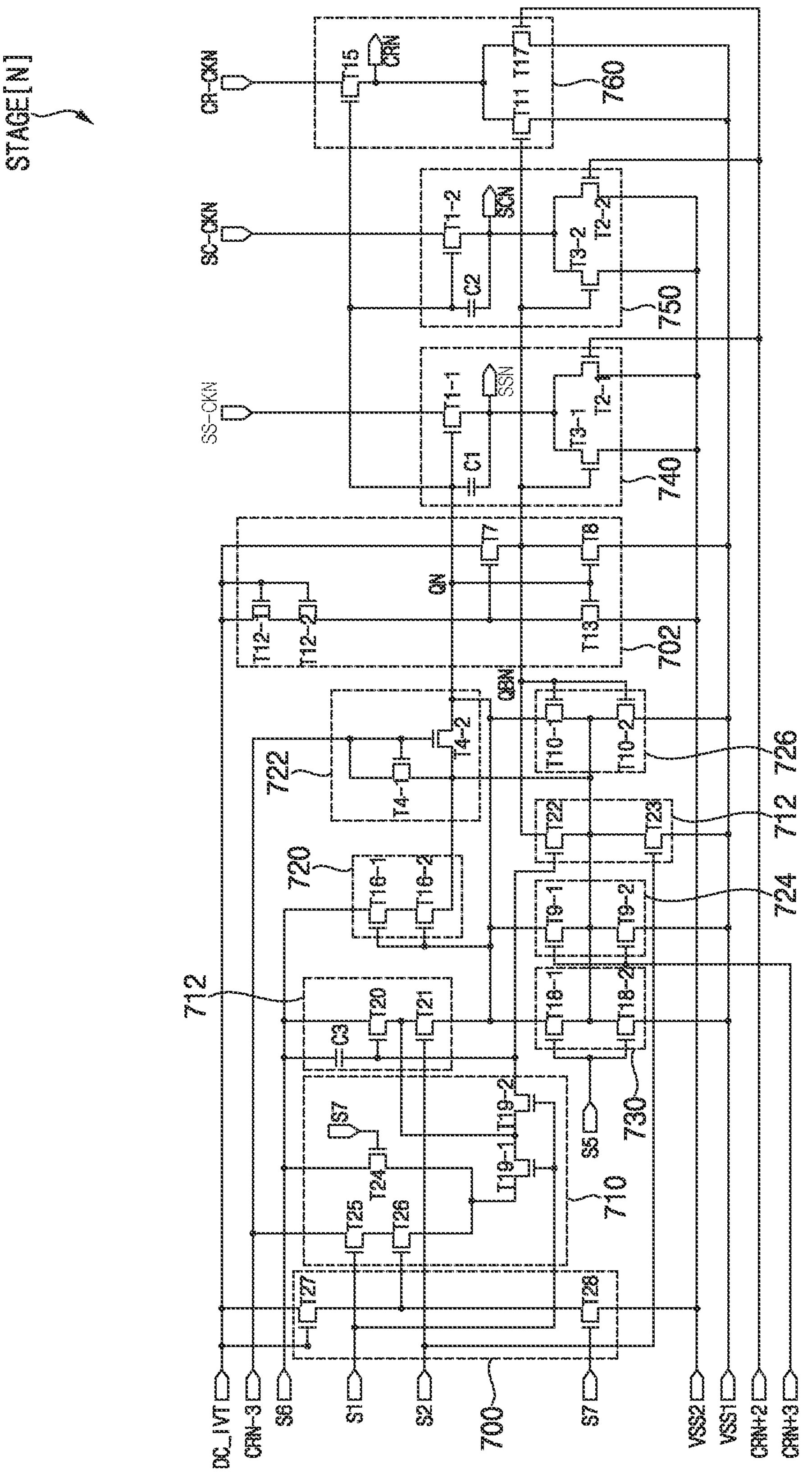
FIG. 4 is a circuit diagram for illustrating a gate driving circuit of a gate driver of FIG. 1.
Figure 5:
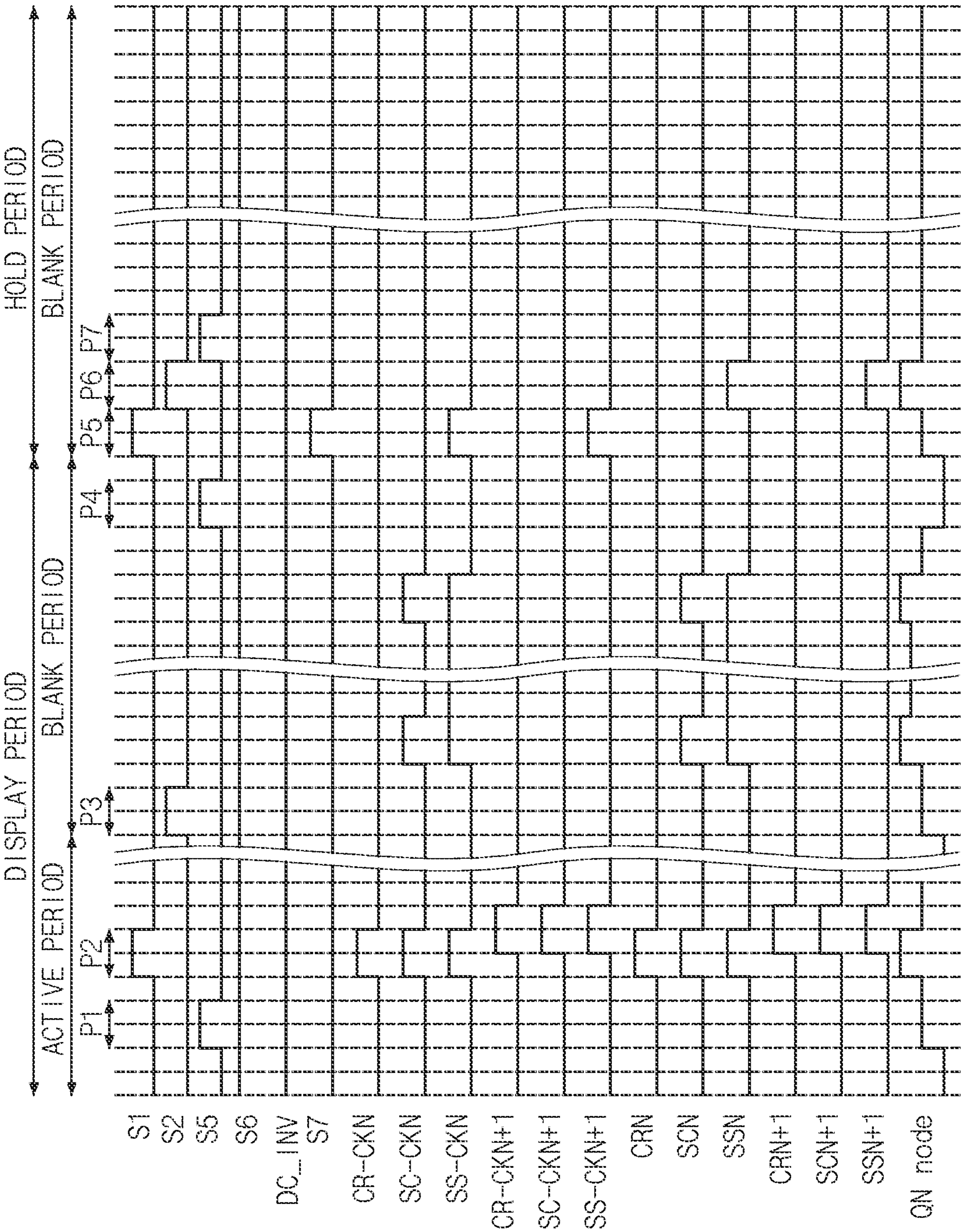
FIG. 5 is a timing diagram for illustrating input signals and output signals of the gate driving circuit of FIG. 4.

FIG. 4 is a circuit diagram for illustrating a gate driving circuit of a gate driver 300 of FIG. 1. FIG. 5 is a timing diagram for illustrating input signals and output signals of the gate driving circuit of FIG. 4.

Referring to FIGS. 1 to 5, a gate driving circuit may include a plurality of stages. In an embodiment, for example, a first stage of the gate driving circuit may output a gate signal corresponding to a first gate line. In an embodiment, for example, a second stage of the gate driving circuit may output a gate signal corresponding to a second gate line. In an embodiment, for example, an N-th stage of the gate driving circuit may output a gate signal corresponding to an N-th gate line.

The N-th stage STAGE[N] may output an N-th sensing gate signal SSN based on an N-th sensing clock signal SS-CKN, a voltage of a QN node (referred to as "first node"), and a voltage of a QBN node (referred to as "second node"). The N-th stage STAGE[N] may output an N-th scan gate signal SCN based on an N-th scan clock signal SC-CKN, the voltage of the QN node, and the voltage of the QBN node. The N-th stage STAGE[N] may output an N-th carry signal CRN based on an N-th carry clock signal CR-CKN, the voltage of the QN node, and the voltage of the QBN node. Here, N is a natural number of 1 or more.

The N-th stage STAGE[N] may include a first inverting circuit 700, a second inverting circuit 702, a first sensing circuit 710 and a second sensing circuit 712.

The first inverting circuit 700 may include a 27$^{th}$ transistor T27 and a 28$^{th}$ transistor T28.

The 27$^{th}$ transistor T27 may include a gate electrode for receiving an inverting voltage DC_IVT, a first electrode for receiving the inverting voltage DC_IVT, and a second electrode connected to a first electrode of the 28$^{th}$ transistor T28. As shown in FIG. 6, the inverting voltage DC_IVT may be a DC signal having a high level.

The 28$^{th}$ transistor T28 may include a gate electrode for receiving a S7 signal, a first electrode connected to the second electrode of the 27$^{th}$ transistor T27, and a second electrode for receiving a second low voltage VSS2.

The first sensing circuit 710 may include a 24$^{th}$ transistor T24, a 25$^{th}$ transistor T25, and a 26 transistor T26.

The 24$^{th}$ transistor T24 may include a gate electrode for receiving the S7 signal, a first electrode for receiving a S6 signal, and a second electrode connected to a second electrode of a 26$^{th}$ transistor T26.

The 25$^{th}$ transistor may include a gate electrode for receiving a S1 signal, a first electrode for receiving a pervious carry signal (e.g., CRN-3), which is one of carry signals of previous stages, a second electrode connected to a first electrode of the 26$^{th}$ transistor 26T.

In this embodiment, the previous carry signal is exemplified as CRN-3, which is a carry signal of a third previous stage, but the present invention is not limited thereto.

The 26$^{th}$ transistor T26 may include a gate electrode connected to the first inverting circuit 700, the first electrode connected to the second electrode of the 25$^{th}$ transistor T25, and the second electrode connected to the second electrode of the 24$^{th}$ transistor T24. As shown in FIG. 5, the S1 signal may have one activation pulse within the display period. A gate line to be sensed (i.e., a sensing target gate line) may be selected by the S1 signal within the display period. The S1 signal may have an activation pulse at a beginning of the hold period.

The first sensing circuit 710 may further include a 19-1 transistor T19-1 and a 19-2 transistor T19-2.

The 19-1 transistor T19-1 may include a gate electrode for receiving the S1 signal, a first electrode connected to the second electrode of the 24$^{th}$ transistor T24, and a second electrode connected to a first electrode of the 19-2 transistor T19-2.

The 19-2 transistor T19-2 may include a gate electrode for receiving the S1 signal, the first electrode connected to the second electrode of the 19-1 transistor T19-1, and a second electrode connected to a second electrode of a third capacitor C3.

The second sensing circuit 712 may include a 20$^{th}$ transistor T20, a 21$^{st}$ transistor T21, and the third capacitor C3.

The 20$^{th}$ transistor T20 may include a gate electrode connected to the second electrode of the third capacitor C3, a first electrode for receiving the S6 signal, and a second electrode connected to a first electrode of the 21$^{st}$ transistor T21. As shown in FIG. 6, the S6 signal may be a DC signal having a high level.

The 21$^{st}$ transistor T21 may include a gate electrode for receiving a S2 signal, the first electrode connected to the second electrode of the 20$^{th}$ transistor T20, and a second electrode connected to the QN node. As shown in FIG. 5, the S2 signal may have an activation pulse at a beginning of a blank period of the display period. When the S2 signal has an activation level, a gate signal may be applied to the sensing target gate line to selected by the S1 signal.

The third capacitor C3 may include a first electrode for receiving the S6 signal and the second electrode connected to the second electrode of the 19-2 transistor T19-2.

The second sensing circuit 712 may further include a 22$^{nd}$ transistor T22 and a 23$^{rd}$ transistor T23.

The 22$^{nd}$ transistor T22 may include a gate electrode connected to the second electrode of the third capacitor C3, a first electrode connected to a second electrode of the 23$^{rd}$ transistor T23, and a second electrode connected to the QBN node.

The 23$^{rd}$ transistor T23 may include a gate electrode for receiving the S2 signal, a first electrode for receiving a first low voltage VSS1, and the second electrode connected to the first electrode of the 22$^{nd}$ transistor T22.

The N-th stage STAGE[N] may further include a first pull up controller 720. The first pull up controller 720 may apply the S6 signal to the QN node based on the voltage of the QN node.

In an embodiment, for example, the first pull up controller 720 may include a 16-1 transistor T16-1 and a 16-2 transistor T16-2.

The 16-1 transistor T16-1 may include a gate electrode connected to the QN node, a first electrode for receiving the S6 signal, and a second electrode connected to a first electrode of the 16-2 transistor.

The 16-2 transistor T16-2 may include a gate electrode connected to the QN node, the first electrode connected to the second electrode of the 16-1 transistor T16-1, and a second electrode connected to a second electrode of a 4-1 transistor T4-1.

The N-th stage STAGE[N] may further include a second pull up controller 722. The second pull up controller 722 may apply the previous carry signal CRN-3 to the QN node based on the previous carry signal CRN-3.

In an embodiment, for example, the second pull up controller 722 may include the 4-1 transistor T4-1 and a 4-2 transistor T4-2.

The 4-1 transistor T4-1 may include a gate electrode for receiving the previous carry signal CRN-3, a first electrode for receiving the previous carry signal CRN-3, and the second electrode connected to the second electrode of the 16-2 transistor T16-2.

The 4-2 transistor T4-2 may include a gate electrode for receiving the previous carry signal CRN-3, a first electrode connected to the second electrode of the 16-2 transistor T16-2, and a second electrode connected to the QN node.

The N-th stage STAGE[N] may further include a third pull up controller 724. The third pull up controller 724 may apply the first low voltage VSS1 to the QN node based on a second next carry signal (e.g., CRN+3) which is one of carry signals of next stages.

In this embodiment, the second next carry signal is exemplified as CRN+3, which is a carry signal of a third next stage, but the present invention is not limited thereto.

In an embodiment, for example, the third pull up controller 724 may include a 9-1 transistor T9-1 and a 9-2 transistor T9-2.

The 9-1 transistor T9-1 may have a gate electrode for receiving the second next carry signal CRN+3 and a first electrode connected to a second electrode of the 9-2 transistor T9-2, and a second electrode connected to the QN node.

The 9-2 transistor T9-2 may include a gate electrode for receiving the second carry signal CRN+3, a first electrode for receiving the first low voltage VSS1, and the second electrode connected to the first electrode of the 9-1 transistor T9-1.

The N-th stage STAGE[N] may further include a fourth pull up controller 726. The fourth pull up controller 726 may apply the first low voltage VSS1 to the QN node based on the voltage of the QBN node.

In an embodiment, for example, the fourth pull up controller 726 may include a 10-1 transistor T10-1 and a 10-2 transistor T10-2.

The 10-1 transistor T10-1 may include a gate electrode connected to the QBN node, a first electrode connected to a second electrode of the 10-2 transistor T10-2, and a second electrode connected to the QN node.

The 10-2 transistor T10-2 may include a gate electrode connected to the QBN node, a first electrode for receiving the first low voltage VSS1, and the second electrode connected to the first electrode of the 10-1 transistor T10-1.

The N-th stage STAGE[N] may include a second inverting circuit 702. The second inverting circuit 702 may apply the inverting voltage DC_IVT to the QN node based on the voltage of the QN node.

In an embodiment, for example, the second inverting circuit 702 may include a $7^{th}$ transistor T7, an $8^{th}$ transistor T8, a 12-1 transistor T12-1, a 12-2 transistor T12-2, and a $13^{th}$ transistor T13.

The $7^{th}$ transistor T7 may include a gate electrode connected to a second electrode of the $13^{th}$ transistor T13, a first electrode connected to the QBN node, and a second electrode for receiving the inverting voltage DC_IVT.

The $8^{th}$ transistor T8 may include a gate electrode connected to the QN node, a first electrode for receiving the first low voltage VSS1, and the second electrode connected to the first electrode of the seventh transistor T7.

The 12-1 transistor T12-1 may include a gate electrode for receiving the inverting voltage DC_IVT, a first electrode for receiving the inverting voltage DC_IVT, and a second electrode connected to a first electrode of the 12-2 transistor T12-2.

The 12-2 transistor T12-2 may include a gate electrode for receiving the inverting voltage DC_IVT, the first electrode connected to the second electrode of the 12-1 transistor T12-1, and a second electrode connected to a second electrode of the $13^{th}$ transistor T13.

The $13^{th}$ transistor T13 may include a gate electrode connected to the QN node, a first electrode for receiving the second low voltage VSS2, and the second electrode connected to the gate electrode of the $7^{th}$ transistor T7.

The N-th stage STAGE[N] may further include a reset circuit 730. The reset circuit 730 may apply the first low voltage VSS1 to the QN node based on a S5 signal. As shown in FIG. 5, the S5 signal may be a signal having an activation pulse at a beginning of the display period, an activation pulse at the blank period of the display period, and an activation pulse at a beginning of the hold period. That is, when the S5 signal has the activation level, the QN node may be reset to the first low voltage VSS1 by the reset circuit 730.

In an embodiment, for example, the reset circuit 730 may include a 18-1 transistor T18-1 and a 18-2 transistor T18-2.

The 18-1 transistor T18-1 may include a gate electrode for receiving the S5 signal, a first electrode connected to a second electrode of the 18-2 transistor T18-2, and a second electrode connected to the QN node.

The 18-2 transistor T18-2 may include a gate electrode for receiving the S5 signal, a first electrode for receiving the first low voltage VSS1, and the second electrode connected to the first electrode of the 18-1 transistor T18-1.

In an embodiment, for example, an intermediate node of the 18-1 transistor T18-1 and the 18-2 transistor T18-2 may be connected to an intermediate node of the 4-1 transistor T4-1 and the 4-2 transistor T4-2, an intermediate node of the 9-1 transistor T9-1 and the 9-2 transistor T9-2, and an intermediate node of the 10-1 transistor T10-1 and the 10-2 transistor T10-2.

The N-th stage STAGE[N] may further include a sensing gate output circuit 740. The sensing gate output circuit 740 may include a 1-1 transistor T1-1, a 2-1 transistor T2-1, a 3-1 transistor T3-1, and a first capacitor C1.

The 1-1 transistor T1-1 may apply the N-th sensing clock signal SS-CKN to a sensing gate output node based on the voltage of the QN node.

The 2-1 transistor T2-1 may apply the second low voltage VSS2 to the sensing gate output node based on a first next carry signal (e.g., CRN+2), which is one of the carry signals of the next stages).

In this embodiment, the first next carry signal is exemplified as CRN+2, which is a carry signal of a second next stage, but the present invention is not limited thereto.

The 3-1 transistor T3-1 may apply the second low voltage VSS2 to the sensing gate output node based on the voltage of the QBN node.

The first capacitor C1 may be connected between the gate electrode of the 1-1 transistor T1-1 and the sensing gate output node.

The N-th stage STAGE[N] may further include a scan gate output circuit 750. The scan gate output circuit 750 may include a 1-2 transistor T1-2, a 2-2 transistor T2-2, a 3-2 transistor T3-2, and a second capacitor C2.

The 1-2 transistors T1-2 may apply an N-th scan clock signal SC-CKN to a scan gate output node based on the voltage of the QN node.

The 2-2 transistor T2-2 may apply the second low voltage VSS2 to the scan gate output node based on the first next carry signal CRN+2.

The 3-2 transistor T3-2 may apply the second low voltage VSS2 to the scan gate output node based on the voltage of the QBN node.

The second capacitor C2 may be connected between a gate electrode of the 1-2 transistor T1-2 and the scan gate output node.

The N-th stage STAGE[N] may further include a carry output circuit 760.

The carry output circuit 760 may include a 15$^{th}$ transistor T15, a 11$^{th}$ transistor T11, and a 17$^{th}$ transistor T17.

The 15$^{th}$ transistor T15 may apply an N-th carry clock signal CR-CKN to a carry output node based on the voltage of the QN node.

The 11$^{th}$ transistor T11 may apply the first low voltage VSS1 to the carry output node based on the voltage of the QBN node.

The 17$^{th}$ transistor T17 may apply the first low voltage VSS1 to the scan gate output node based on the first next carry signal CRN+2.

Figure 6A:
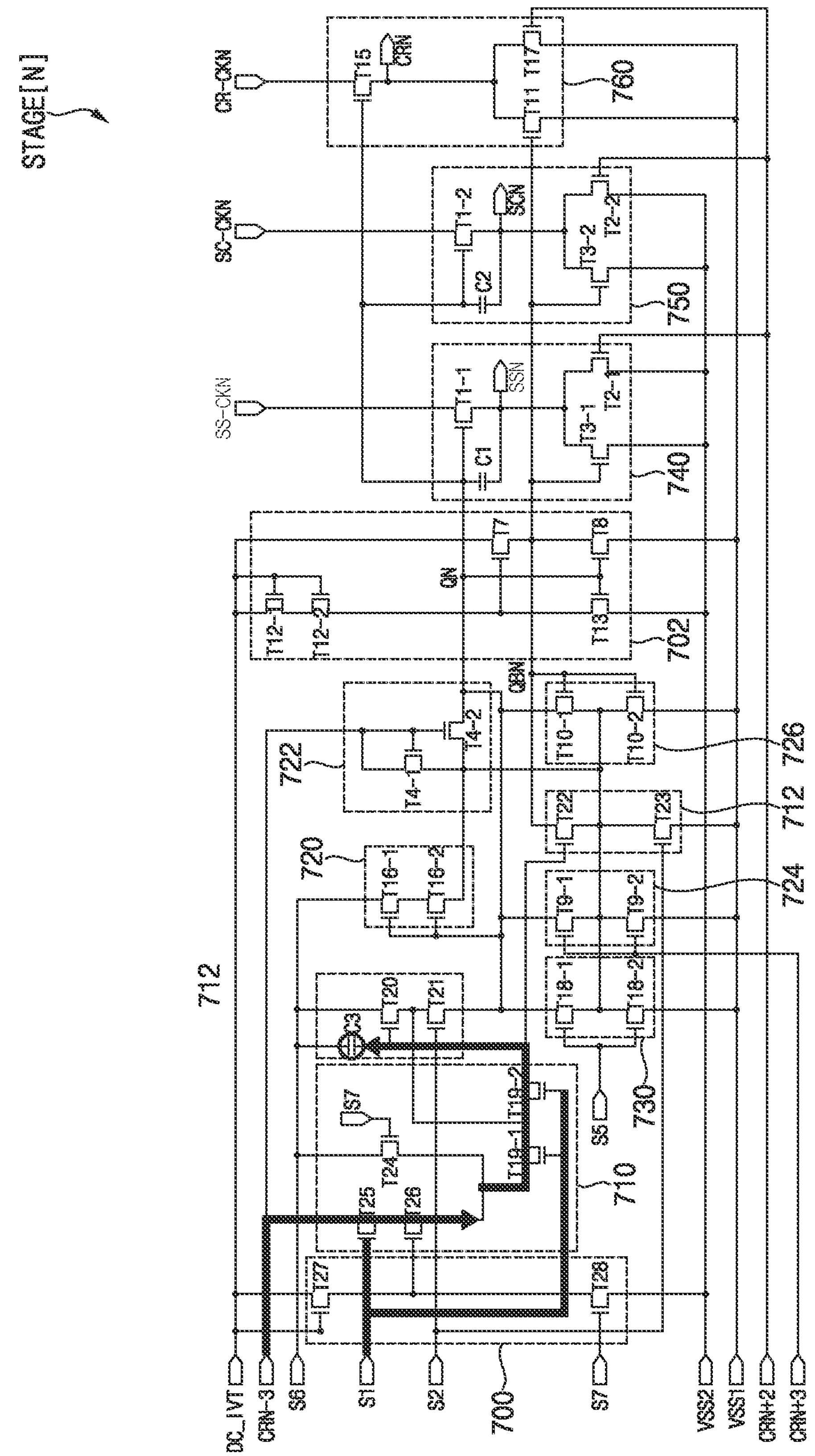
FIGS. 6A and 6B are circuit diagrams for illustrating a selective sensing operation of the gate driving circuit of FIG. 4.
Figure 6B:
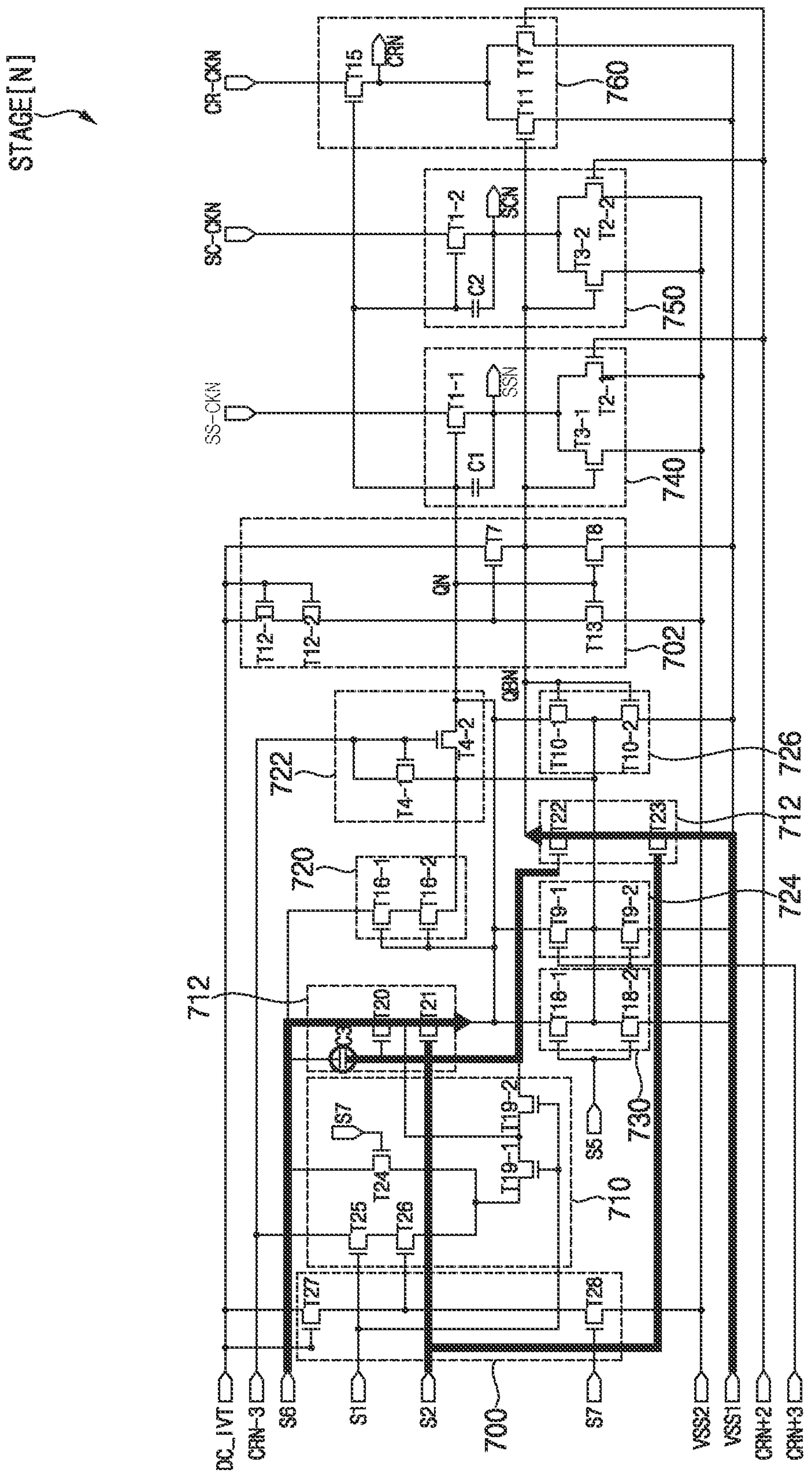

FIGS. 6A and 6B are circuit diagrams for illustrating a selective sensing operation of the gate driving circuit of FIG. 4.

Referring to FIGS. 1 to 6B, the first sensing circuit 710 may select the sensing target gate line based on the S1 signal, and the first inverting circuit 700 may control the first sensing circuit 710 based on the S7 signal. The second sensing circuit 712 may control the voltage of the QN node using the first sensing circuit 710 based on the S2 signal.

The S1 signal may have the activation pulse in the second period P2, and the S7 signal may not have the activation pulse in the second period P2. The sensing target gate line may be selected by the S1 signal within the display period.

The 25$^{th}$ transistor T25, the 26$^{th}$ transistor T26, the 19-1 transistor T19-1, and the 19-2 transistor T19-2 may be turned on, and the 24$^{th}$ transistor T24 and the 28$^{th}$ transistor T28 may be turned off. As shown in FIG. 6A, the previous carry signal CRN-3 may be applied to the second electrode of the third capacitor C3, and the third capacitor C3 may be charged.

The S2 signal may have the activation pulse in the third period P3, and the S7 signal may not have the activation pulse in the third period P3. When the S2 signal has an activation level, a gate signal may be applied to the sensing target gate line selected by the S1 signal.

The 20$^{th}$ transistor T20, the 21$^{st}$ transistor T21, the 22$^{nd}$ transistor T22, and the 23rd transistor T23 may be turned on, and the 24$^{th}$ transistor T24 and the 28$^{th}$ transistor T28 may be turned off. As shown in FIG. 6B, the S6 signal may be applied to the QN node, and the first low voltage VSS1 may be applied to the QBN node.

The gate driver 300 may apply the gate signal to the sensing target gate line based on the voltage of the QN node and the voltage of the QBN node.

Figure 7A:
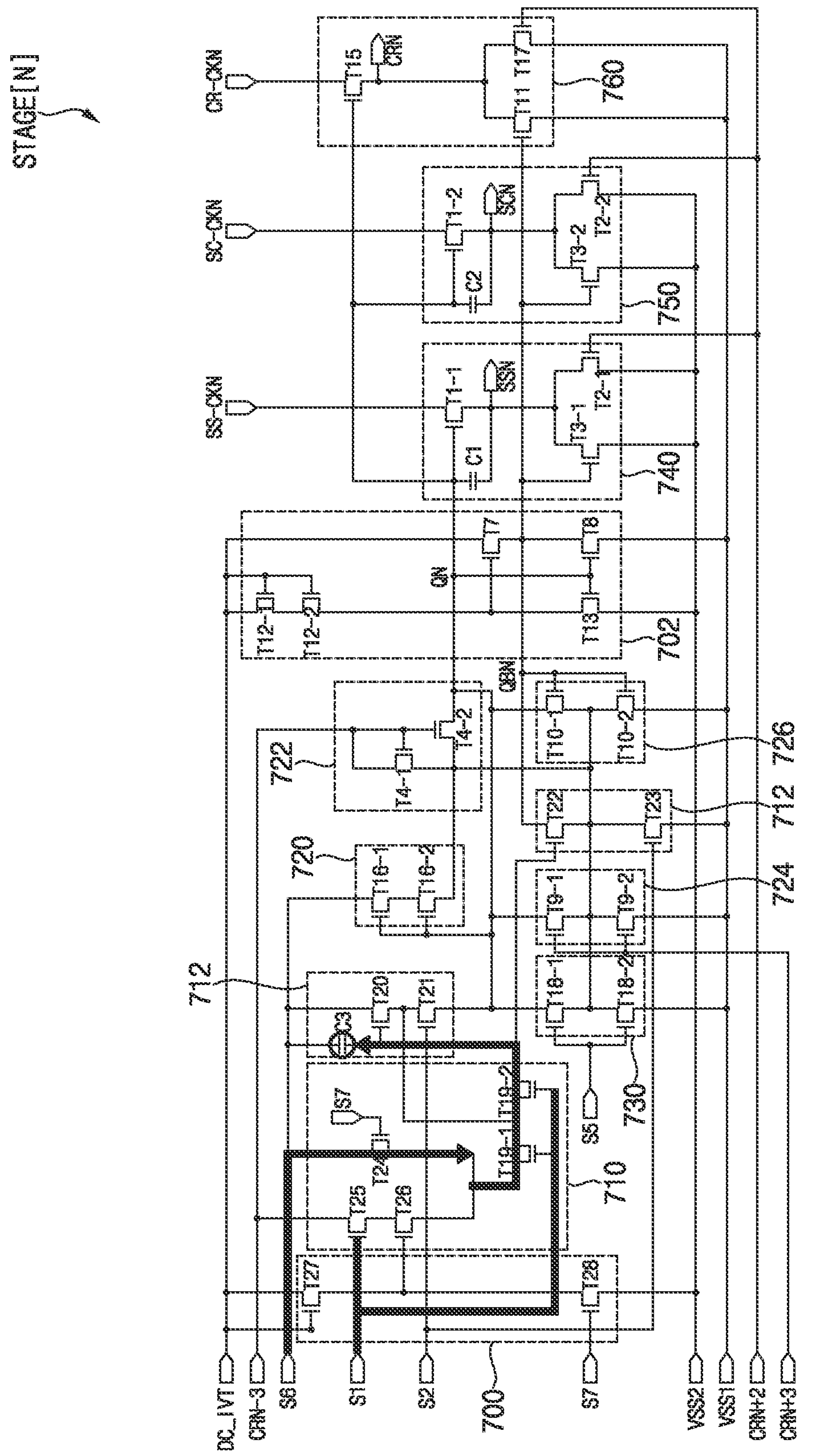
FIGS. 7A and 7B are circuit diagrams for illustrating a frame reset operation of the gate driving circuit of FIG. 4.
Figure 7B:
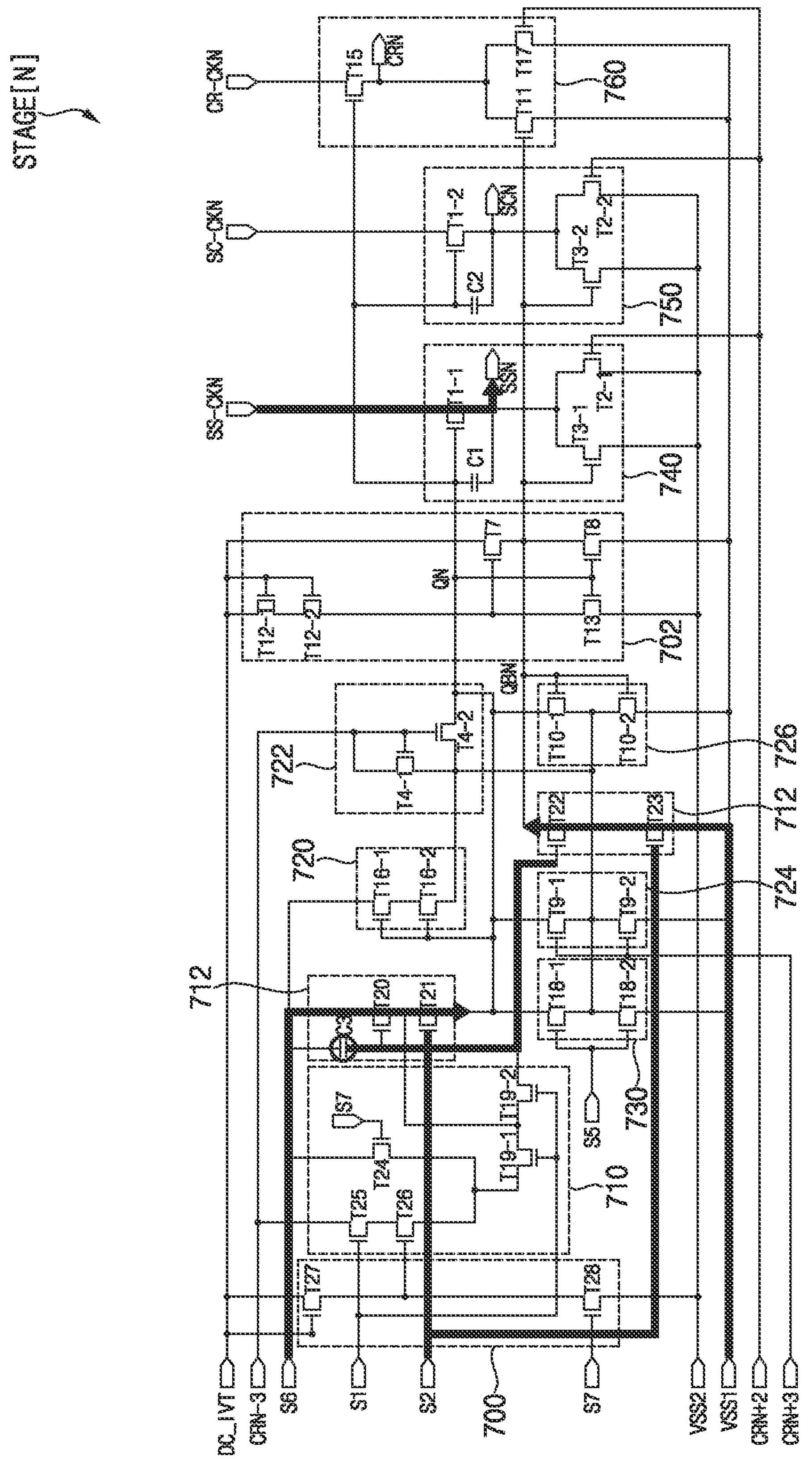

FIGS. 7A and 7B are circuit diagrams for illustrating a frame reset operation of the gate driving circuit of FIG. 4.

Referring to FIGS. 1 to 7B, the first sensing circuit 710 may determine frame reset based on the S7 signal. The frame reset may be determined based on the maximum frequency of the variable frame frequency.

The S1 signal and the S7 signal may have the activation pulse in a fifth period P5.

The 19-1 transistor T19-1, the 19-2 transistor T19-2, the 24$^{th}$ transistor T24, the 25$^{th}$ transistor T25, and the 28$^{th}$ transistor T28 may be turned on, and the 26$^{th}$ transistor T26 may be turned off. As shown in FIG. 7A, the S6 signal may be applied to the second electrode of the third capacitor C3, and the third capacitor C3 may be charged.

The S2 signal may have the activation pulse in a sixth period P6, and the S7 signal may not have the activation pulse in the sixth period P6. When the S2 signal has an activation level, a gate signal may be applied to the gate line GL.

The 20$^{th}$ transistor T20, the 21$^{st}$ transistor T21, the 22$^{nd}$ transistor T22, and the 23rd transistor T23 may be turned on, and the 24$^{th}$ transistor T24 and the 28$^{th}$ transistor may be turned off. As shown in FIG. 7B, the S6 signal may be applied to the QN node, and the first low voltage VSS1 may be applied to the QBN node.

The gate driver 300 may apply the gate signal to the gate lines GL based on the voltage of the QN node and the voltage of the QBN node.

Figure 8:
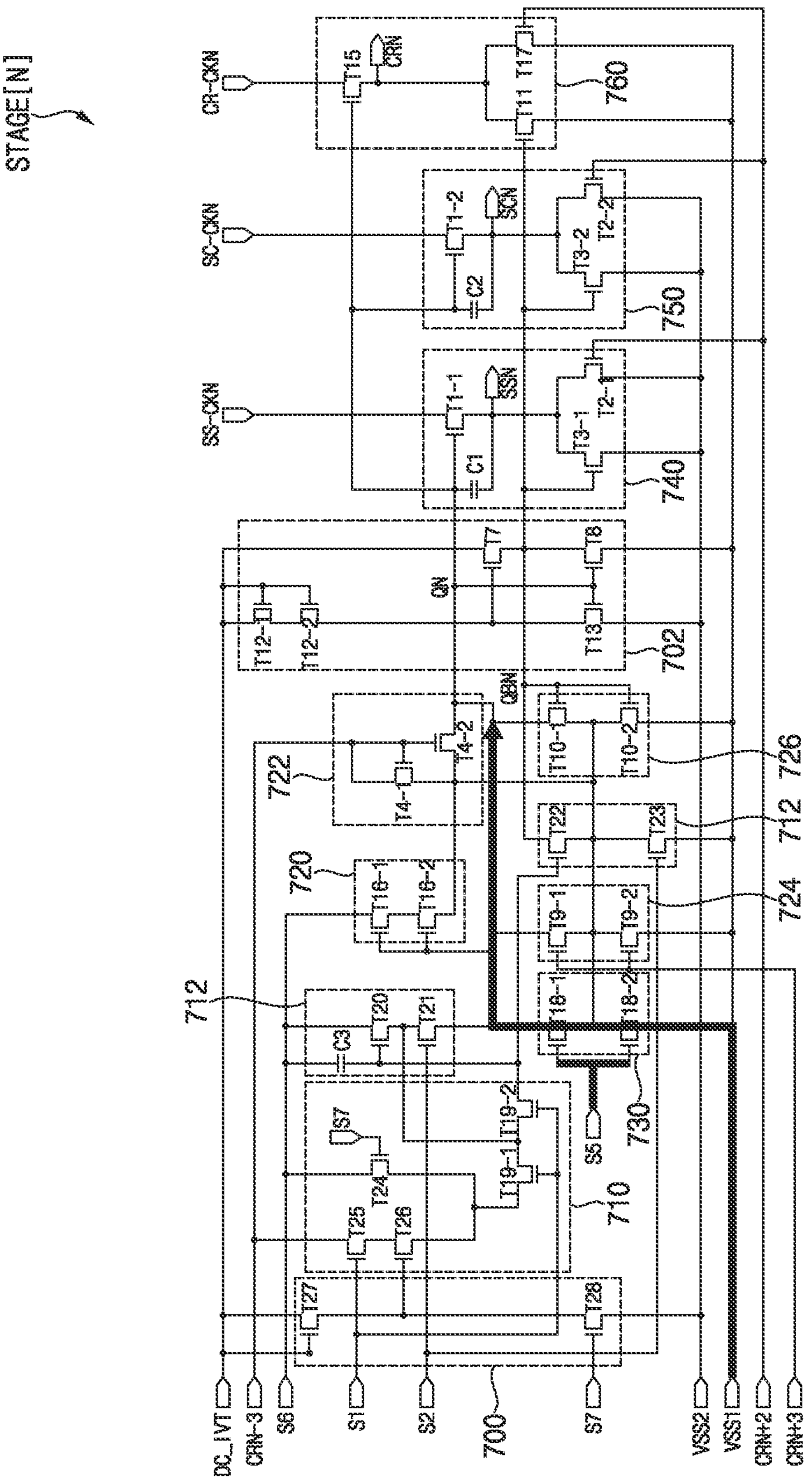
FIG. 8 is a circuit diagram for illustrating a QN node reset operation of the gate driving circuit of FIG. 4.

FIG. 8 is a circuit diagram for illustrating a QN node reset operation of the gate driving circuit of FIG. 4.

Referring to FIGS. 1 to 8, the reset circuit 730 may initialize the QN node based on the S5 signal.

The S5 signal may have the activation pulses in a first period P1, a fourth period P4, and a seventh period P7.

The 18-1 transistor T18-1 and the 18-2 transistor T18-2 may be turned on. As shown in FIG. 8, the first low voltage VSS1 may be applied to the QN node.

As described above, the gate driving circuit and the display device 10 include the first sensing circuit 710 which selects the sensing target gate line based on the S1 signal or determines the frame reset based on the S7 signal, the first inverting circuit 700 which controls the first sensing circuit 710 based on the S7 signal, and the second sensing circuit which controls the voltage of the QN node using the first sensing circuit 710 based on the S2 signal. The frame reset may be determined based on the maximum frequency of the variable frame frequency. Accordingly, the display device 10 may display images with uniform luminance at different frame frequencies.

Figure 9:
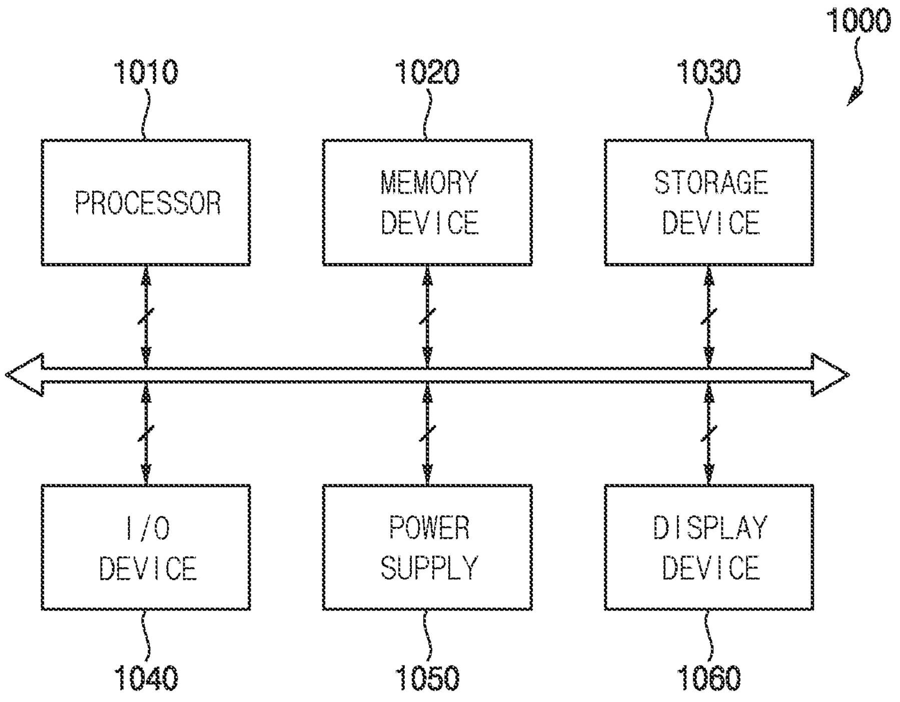
FIG. 9 is a block diagram for illustrating an electronic device.
Figure 10:
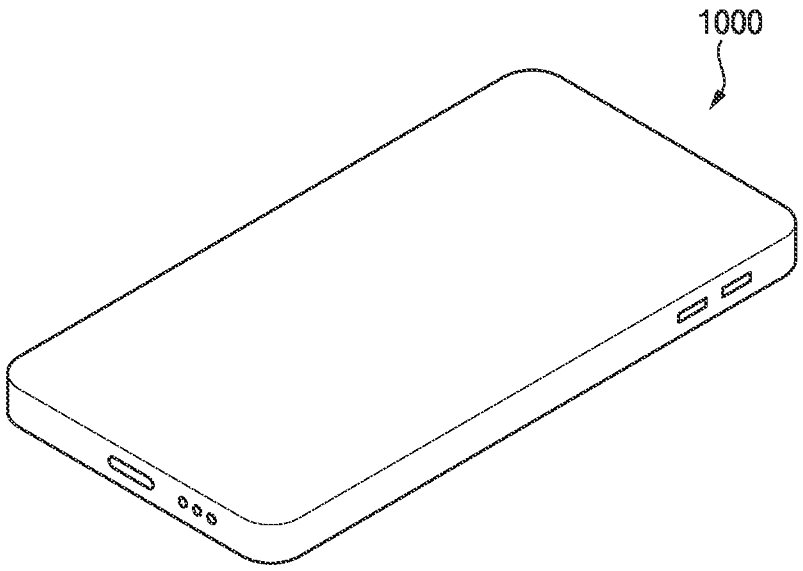
FIG. 10 is a diagram for illustrating an embodiment in which the electronic device of FIG. 9 is implemented as a smart phone.

FIG. 9 is a block diagram for illustrating an electronic device 1000. FIG. 10 is a diagram for illustrating an embodiment in which the electronic device 1000 of FIG. 9 is implemented as a smart phone.

Referring to FIGS. 9 and 10, the electronic device 1000 may include a processor 1010, a memory device 1020, a storage device 1030, an input/output ("I/O") device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus ("USB") device, other electronic devices, and the like.

In an embodiment, as illustrated in FIG. 10, the electronic device 1000 may be implemented as a smart phone. However, the electronic device 1000 is not limited thereto. For another example, the electronic device 1000 may be implemented as a cellular phone, a video phone, a smart pad, a smart watch, a tablet PC, a car navigation system, a computer monitor, a laptop, a head mounted display ("HMD") device, and the like.

The processor 1010 may perform various computing functions. The processor 1010 may be a microprocessor, a central processing unit ("CPU"), an application processor ("AP"), and the like. The processor 1010 may be coupled to other components via an address bus, a control bus, a data bus, and the like. Further, the processor 1010 may be coupled to an extended bus such as a peripheral component interconnection ("PCI") bus.

The memory device 1020 may store data for operations of the electronic device 1000. In an embodiment, for example, the memory device 1020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, and the like and/or at least one volatile memory device such as a dynamic random access memory ("DRAM") device, a static random access memory ("SRAM") device, a mobile DRAM device, and the like.

The storage device 1030 may include a solid state drive ("SSD") device, a hard disk drive ("HDD") device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The inventions may be applied to any display device and any electronic device including the touch panel. In an embodiment, for example, the inventions may be applied to a mobile phone, a smart phone, a tablet computer, a digital television ("TV"), a 3D TV, a personal computer ("PC"), a home appliance, a laptop computer, a personal digital assistant ("PDA"), a portable multimedia player ("PMP"), a digital camera, a music player, a portable game console, a navigation device, etc.

The foregoing is illustrative of the invention and is not to be construed as limiting thereof. Although a few embodiments of the invention have been described, those skilled in the art will readily appreciate that many modifications are possible in the embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A gate driving circuit comprising:

a stage configured to output a scan gate signal based on a scan clock signal, a voltage of a first node, and a voltage of a second node, and to output a sensing gate signal based on, a sensing clock signal, the voltage of the first node, and the voltage of the second node, wherein the stage includes:

a first sensing circuit configured to select a gate line to be sensed based on a S1 signal or to determine a frame reset based on a S7 signal;

a first inverting circuit configured to control the first sensing circuit based on the S7 signal; and a second sensing circuit configured to control the voltage of the first node using the first sensing circuit based on a S2 signal, and wherein the frame reset is determined based on a maximum frequency of a variable frame frequency, wherein the first sensing circuit includes a 24th transistor, a 25th transistor, and a 26th transistor, wherein the 24th transistor includes a gate electrode for receiving the S7 signal, a first electrode for receiving a S6 signal, a second electrode connected to a second electrode of the 26 transistor, the 25th transistor includes a gate electrode for receiving the S1 signal, a first electrode for receiving a previous carry signal which is one of carry signals of previous stages, a second electrode connected to a first electrode of the 26th transistor, and the 26th transistor includes a gate electrode connected to the first inverting circuit, the first electrode connected to the second electrode of the 25th transistor, and the second electrode connected to the second electrode of the 24th transistor.

2. The gate driving circuit of claim 1, wherein the first inverting circuit includes a 27th transistor and a 28th transistor, wherein the 27th transistor includes a gate electrode for receiving an inverting voltage, a first electrode for receiving the inverting voltage, and a second electrode connected to a first electrode of the 28th transistor, and the 28th transistor includes a gate electrode for receiving the S7 signal, the first electrode connected to the second electrode of the 27th transistor, and a second electrode for receiving a second low voltage.

3. The gate driving circuit of claim 1, wherein the first sensing circuit further includes a 19-1 transistor and a 19-2 transistor, wherein the 19-1 transistor includes a gate electrode for receiving the S1 signal, a first electrode connected to the second electrode of the 24th transistor, a second electrode connected to a first electrode of the 19-2 transistor, and the 19-2 transistor includes a gate electrode for receiving the S1 signal, the first electrode connected to the second electrode of the 19-1 transistor, and a second electrode connected to a second electrode of a third capacitor.

4. The gate driving circuit of claim 3, wherein the second sensing circuit includes a 20th transistor, a 21st transistor, and the third capacitor, wherein the 20th transistor includes a gate electrode connected to the second electrode of the third capacitor, a first electrode for receiving the S6 signal, and a second electrode connected to a first electrode of the 21 st transistor, the 21st transistor includes a gate electrode for receiving the S2 signal, the first electrode connected to the second electrode of the 20th transistor, a second electrode connected to the first node, and the third capacitor includes a first electrode for receiving the S6 signal and the second electrode connected to the second electrode of the 19-2 transistor.

5. The gate driving circuit of claim 4, wherein the second sensing circuit further includes a 22nd transistor and a 23rd transistor, wherein the 22nd transistor includes a gate electrode connected to the second electrode of the third capacitor, a first electrode connected a second electrode of the 23rd transistor, a second electrode connected to the second node, and the 23rd transistor includes a gate electrode for receiving the S2 signal, a first electrode for receiving a first low voltage, and the second electrode connected the first electrode of the 22nd transistor.

6. The gate driving circuit of claim 1, wherein the stage further includes a first pull up control circuit, and wherein the first pull up control circuit applies a S6 signal to the first node based on the voltage of the first node.

7. The gate driving circuit of claim 6, wherein the stage further includes a second pull up control circuit, and wherein the second pull up control circuit applies a previous carry signal which is one of carry signals of previous stages to the first node based on the previous carry signal.

8. The gate driving circuit of claim 7, wherein the stage further includes a third pull up control circuit, and wherein the third pull up control circuit applies a first low voltage to the first node based on a second next carry signal which is one of carry signals of next stages.

9. The gate driving circuit of claim 8, wherein the stage further includes a fourth pull up control circuit, and wherein the fourth pull up control circuit applies a first low voltage to the first node based on the voltage of the second node.

10. The gate driving circuit of claim 9, wherein the stage further includes a second inverting circuit, and wherein the second inverting circuit applies an inverting voltage to the first node based on the voltage of the QB node.

11. The gate driving circuit of claim 8, wherein the stage further includes a scan gate output circuit, wherein the scan gate output circuit includes:

a 1-2 transistor configured to apply a scan clock signal to a scan gate output node based on the voltage of the first node;

a 2-2 transistor configured to apply the second low voltage to the scan gate output node based on the first next carry signal;

a 3-2 transistor configured to apply the second low voltage to the scan gate output node based on the voltage of the second node; and a second capacitor connected between a gate electrode of the 1-2 transistor and the scan gate output node.

12. The gate driving circuit of claim 11, wherein the stage further includes a carry output circuit, wherein the carry output circuit includes: a 15th transistor configured to apply a carry clock signal to a carry output node based on the voltage of the first node; a 11th transistor configured to apply a first low voltage to the carry output node based on the voltage of the second node; and a 17th transistor configured to apply the first low voltage to the carry output node based on the first next carry signal.

13. The gate driving circuit of claim 1, wherein the stage further includes a reset circuit, and wherein the reset circuit applies a first low voltage to the first node based on a S5 signal.

14. The gate driving circuit of claim 1, wherein the stage further includes a sensing gate output circuit, and wherein the sensing gate output circuit includes:

a 1-1 transistor configured to apply the sensing clock signal to a sensing gate output node based on the voltage of the first node;

a 2-1 transistor configured to apply a second low voltage to the sensing gate output node based on a first next carry signal which is one of carry signals of next stages;

a 3-1 transistor configured to apply the second low voltage to the sensing gate output node based on the voltage of the second node; and a first capacitor connected between a gate electrode of the 1-1 transistor and the sensing gate output node.

15. A display device comprising: a display panel including a pixel; and a gate driver configured to apply a scan gate signal and a sensing gate signal to the pixel, wherein a gate driving circuit of the gate driver includes: a stage configured to output a scan gate signal based on a scan clock signal, a voltage of a first node, and a voltage of a second node, and to output a sensing gate signal based on, a sensing clock signal, the voltage of the first node, and the voltage of the second node, wherein the stage includes: a first sensing circuit configured to select a gate line to be sensed based on a S1 signal or to determine a frame reset based on a S7 signal; a first inverting circuit configured to control the first sensing circuit based on the S7 signal; and a second sensing circuit configured to control the voltage of the first node using the first sensing circuit based on a S2 signal, and wherein the frame reset is determined based on a maximum frequency of a variable frame frequency, wherein the first sensing circuit includes a 24th transistor, a 25th transistor, and a 26th transistor, wherein the 24th transistor includes a gate electrode for receiving the S7 signal, a first electrode for receiving a S6 signal, a second electrode connected to a second electrode of the 26 transistor, the 25th transistor includes a gate electrode for receiving the S1 signal, a first electrode for receiving a previous carry signal which is one of carry signals of previous stages, a second electrode connected to a first electrode of the 26th transistor, and the 26th transistor includes a gate electrode connected to the first inverting circuit, the first electrode connected to the second electrode of the 25th transistor, and the second electrode connected to the second electrode of the 24th transistor.

16. The display device of claim 15, wherein the first inverting circuit includes a 27th transistor and a 28th transistor, wherein the 27th transistor includes a gate electrode for receiving an inverting voltage, a first electrode for receiving the inverting voltage, and a second electrode connected to a first electrode of the 28th transistor, and the 28th transistor includes a gate electrode for receiving the S7 signal, the first electrode connected to the second electrode of the 27th transistor, and a second electrode for receiving a second low voltage.

17. The display device of claim 15, wherein the first sensing circuit further includes a 19-1 transistor and a 19-2 transistor, wherein the 19-1 transistor includes a gate electrode for receiving the S1 signal, a first electrode connected to the second electrode of the 24th transistor, a second electrode connected to a first electrode of the 19-2 transistor, and the 19-2 transistor includes a gate electrode for receiving the S1 signal, the first electrode connected to the second electrode of the 19-1 transistor, and a second electrode connected to a second electrode of a third capacitor.

18. The display device of claim 17, wherein the second sensing circuit includes a 20th transistor, a 21st transistor, and the third capacitor, wherein the 20th transistor includes a gate electrode connected to the second electrode of the third capacitor, a first electrode for receiving the S6 signal, and a second electrode connected to a first electrode of the 21 st transistor, the 21st transistor includes a gate electrode for receiving the S2 signal, the first electrode connected to the second electrode of the 20th transistor, a second electrode connected to the first node, and the third capacitor includes a first electrode for receiving the S6 signal and the second electrode connected to the second electrode of the 19-2 transistor.

* * * * *